(No Model.)

A. D. BROGAN & A. M. MALLOCH.
PROCESS OF MANUFACTURING CHECKERED GLASS.

No. 370,176.   Patented Sept. 20, 1887.

Attest:
Emma Arthur
F. A. Hopkins

Inventors;
A. D. Brogan
A. M. Malloch
By Knight Bro
Atty's.

UNITED STATES PATENT OFFICE.

ANTHONY D. BROGAN AND ANDREW M. MALLOCH, OF FIRHILL, GLASGOW, COUNTY OF LANARK, SCOTLAND.

PROCESS OF MANUFACTURING CHECKERED GLASS.

SPECIFICATION forming part of Letters Patent No. 370,176, dated September 20, 1887.

Application filed February 21, 1887. Serial No. 228,449. (No model.) Patented in England November 8, 1886, No. 14,380.

*To all whom it may concern:*

Be it known that we, ANTHONY DIXON BROGAN and ANDREW MURRAY MALLOCH, citizens of the United Kingdom of Great Britain and Ireland, residing at Firhill, Glasgow, in the county of Lanark, Scotland, have invented new and useful Improvements in the Process of Manufacturing Checkered Glass, (which has not been patented in any country except Great Britain, by Letters Patent dated November 8, 1886, No. 14,380;) and we do hereby declare that the following is a full, clear, and exact description of the invention, which will enable others skilled in the manufacture or art to which it relates to make and use the same.

In the manufacture of checkered glass the checks or squares, which are formed by cross-lines appearing in relief on the surface of the glass, are produced by suitably grooving the roller of a glass-rolling machine, the casting-table over which the plastic glass is rolled being a plane surface and designed to form the smooth side of the plate. The checks or squares so produced are usually of imperfect form, and the flat side of the glass plate, which is chilled by contact with the table, is dull and rough, instead of being clear and smooth.

The object of our invention is to insure the production of checkered glass having on the one side checks or squares of distinct outline and perfect form, while the other side has a smooth and polished appearance; and to that end we roll the glass into sheets or plates with a plain smooth roller over a table in which cross grooves or lines corresponding to those which are to appear on the surface of the glass are cut or otherwise formed. After passing the roller over the molten glass, the sheet so formed is momentarily lifted at one end while in a plastic or partially-stiffened state, in order to admit air under it and prevent dimming of the checkered surface of the glass by the rapid cooling action of the table.

Figure 2:
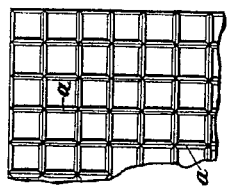
Figure 3:
Figure 1:
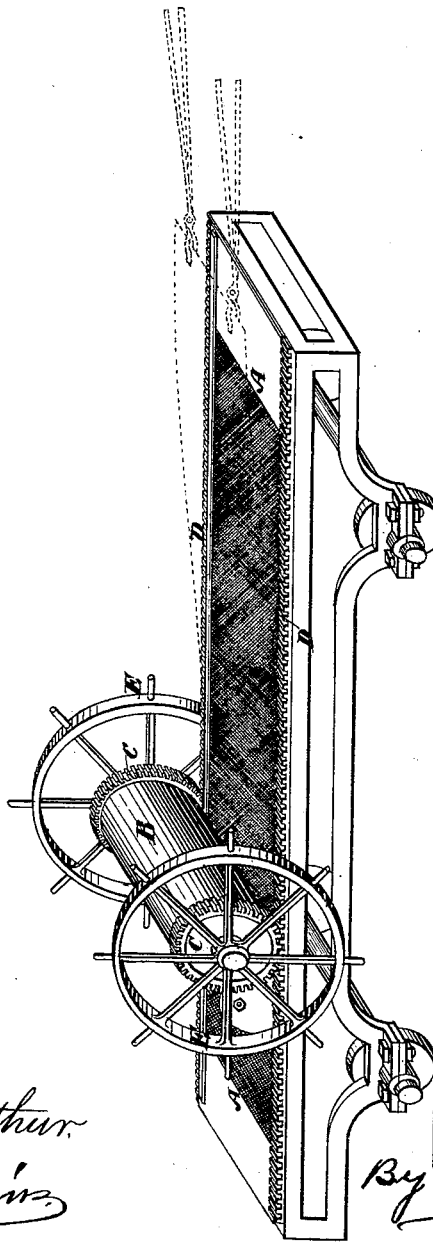

In the accompanying drawings, Figure 1 is a perspective view of a glass-casting apparatus adapted for the production of the improved checkered glass, and Figs. 2 and 3 are respectively a full-size plan and cross-section of a piece of the glass.

The table A of the apparatus is suitably grooved longitudinally and transversely, the grooves being of a formation to correspond to the ridges *a*, which, as seen in Fig. 3, are to be produced on the glass. The roller B is smooth, and its spindle is provided with the usual spur-wheels, C, gearing into racks D in the table, and with handing-wheels E, by which it is operated. The glass, when rolled on the table into a sheet by the passage over it of the roller B, is permitted to partially stiffen, but while still in a sufficiently-plastic condition is lifted by means of tongs or otherwise, as indicated by the dotted lines in Fig. 1, to admit air under it, and is thereafter drawn off the table onto a trolley, upon which it is carried to an annealing-kiln. A portion of the table at each end, or at the end from which the glass sheet is removed to the trolley, is by preference made smooth, or left without grooves, so that the checkered surface of the sheet may be the more readily drawn off the table without injury.

Having now described the invention, what we desire to claim and secure by Letters Patent is—

The herein-described method of producing checkered glass, consisting in rolling molten glass upon a grooved table by means of a smooth roller and lifting the sheet so formed while in a plastic state to admit air thereunder, substantially as set forth.

In witness whereof we have hereunto set our hands this 31st day of January, 1887.

A. D. BROGAN.
      A. M. MALLOCH.

Witnesses:
 GEO. M. CRUIKSHANK,
*Fel. Inst. Patent Agents, 62 St. Vincent Street, Glasgow.*
 WALLACE FAIRWEATHER,
*Fel. Inst. Patent Agents, 62 St. Vincent Street, Glasgow.*